United States Patent
Hoyt

(10) Patent No.: US 7,924,767 B2
(45) Date of Patent: Apr. 12, 2011

(54) CONTROL AND STATUS PROTOCOL

(75) Inventor: Riley Steve Hoyt, Fort Langley (CA)

(73) Assignee: Sierra Wireless, Inc., Richmond, BC (CA)

(\*) Notice: Subject to any disclaimer, the term of this patent is extended or adjusted under 35 U.S.C. 154(b) by 2141 days.

(21) Appl. No.: 10/330,688

(22) Filed: Dec. 26, 2002

(65) Prior Publication Data

US 2004/0125774 A1 Jul. 1, 2004

(51) Int. Cl.
*H04W 4/00* (2009.01)
*H04B 7/216* (2006.01)
*H04L 12/66* (2006.01)
*H04L 5/16* (2006.01)

(52) U.S. Cl. ........ 370/328; 370/335; 370/338; 370/356; 375/222

(58) Field of Classification Search .................. None
See application file for complete search history.

(56) References Cited

U.S. PATENT DOCUMENTS

| | | | |
|---|---|---|---|
| 6,785,556 B2 * | 8/2004 | Souissi | 455/557 |
| 6,799,030 B2 * | 9/2004 | Barber et al. | 455/343.1 |
| 6,891,825 B1 * | 5/2005 | O'Dell et al. | 370/352 |
| 6,930,987 B1 * | 8/2005 | Fukuda et al. | 370/328 |
| 6,970,127 B2 * | 11/2005 | Rakib | 341/173 |
| 7,025,209 B2 * | 4/2006 | Hawkins | 209/217 |

FOREIGN PATENT DOCUMENTS

| | | |
|---|---|---|
| EP | 0 789 468 | 8/1997 |
| WO | WO 02/13593 | 2/2002 |

OTHER PUBLICATIONS

WO 02/13593 A3, Feb. 21, 2002, Souisse.*
International Search Report dated Jul. 8, 2004, PCT/CA03/02037.
Barker, P. et al., "Performance Modeling of the IrDA Protocol for Infrared Wireless Communications," IEEE Communications Magazine, Dec. 1998, pp. 113-117.
Xiaogang, Z. et al., "The Software & Hardware Realization of Wireless Modem for CDPD Data Network," Communications Technology, No. 1, 2001, No. 112 Totally, pp. 5/7-7/7. (English abstract included).
European Office Action in European Application Serial No. 03785444.5, dated Dec. 3, 2008.
European Office Action in European Application Serial No. 03785444.5, dated Aug. 2, 2007.
Chinese Office Action in Chinese Application No. 200380109346.5, dated Apr. 7, 2010.
Chinese Office Action in Chinese Application No. 200380109346.5, dated Jul. 10, 2009.
Chinese Office Action in Chinese Application No. 200380109346.5, Nov. 21, 2008.
Canadian Office Action in Canadian Application No. 2,511,951, dated May 21, 2010.

* cited by examiner

*Primary Examiner* — Melanie Jagannathan
(74) *Attorney, Agent, or Firm* — Nixon Peabody LLP

(57) ABSTRACT

A host interface protocol and a control and status protocol for use with host unit and a wireless communication unit are described. The host interface protocol allows for multiplexing between data transfer messages and control and status messages. In a preferred embodiment, the control and status message protocol supports messages that can be a message payload of a host interface protocol payload.

28 Claims, 6 Drawing Sheets

CONTROL AND STATUS PROTOCOL

FIELD OF THE INVENTION

The present invention relates to wireless communication units, such as modems, for data devices. In particular, the present invention relates to communication protocols between a data device and a wireless communication unit.

BACKGROUND OF THE INVENTION

Typically, a host unit controls the operation of a modem unit. The host unit will obtain status information from the modem unit and use this status information to determine the best way to control the modem unit. Received signal strength and similar information is provided by the modem unit to the host unit. Additionally, data to transmit is sent from the host unit to the modem unit and data received by the modem unit needs to be sent from the modem unit to the host unit.

The data sent between the modem unit and the host unit can be relatively large. In some circumstances, this blocks the ability of control and status information to be transferred between the host unit and the modem unit.

It is desired to have an improved protocol system for sending messages between a host unit and a modem unit.

SUMMARY OF THE INVENTION

The present invention uses a host interface protocol which allows for the multiplexing of data signals with control and status signals, debugging information and other commands. The host interface protocol preferably includes a length field, a message ID field indicating what type of message is enclosed, and an optional payload field.

Control and status protocols can be transferred within the optional payload field. A separate control and status protocol is used to transfer the control and status messages.

One embodiment of the present invention is a system including a host unit with a processor and wireless communication unit, such as a modem unit, including a transceiver and first-in-first-out-buffers (FIFO). Communication between the host unit and the wireless communication unit uses a host interface protocol. The host interface protocol defines a message header with a length field and a message ID field. The message 1D field allows multiplexing between data stream transfers and status transfers for information sent to the host and wireless communication units. A control and status protocol is used for control and status message transfers between the host and the wireless communication unit, control and status messages being wrapped within the host interface protocol messages.

Another embodiment of the present invention comprises a protocol system for transfers between a host unit and a wireless communication unit. A host interface protocol defines a message header with a length field and a message ID field. The message ID field allowing multiplexing between data stream transfers and status transfers for information sent to buffers of the host and wireless communication unit. A control and status protocol is used for control and status message transfers between the host and wireless communication unit. Control and status messages are wrapped within a host interface protocol message.

Another embodiment of the present invention is a method for operating a wireless communication unit. The method includes buffering messages from a host unit in a buffer, and examining messages from the buffer according to the host interface protocol. The host interface protocol defines a message header with a length field and message ID field. If the message ID field indicates data to be transmitted, transmitting data, wherein a control message with a corresponding host interface protocol message ID, can be received within the buffer interspersed with messages for the data transmission to allow for multiplexing.

BRIEF DESCRIPTION OF THE DRAWING FIGURES

DETAILED DESCRIPTION

Figure 1:
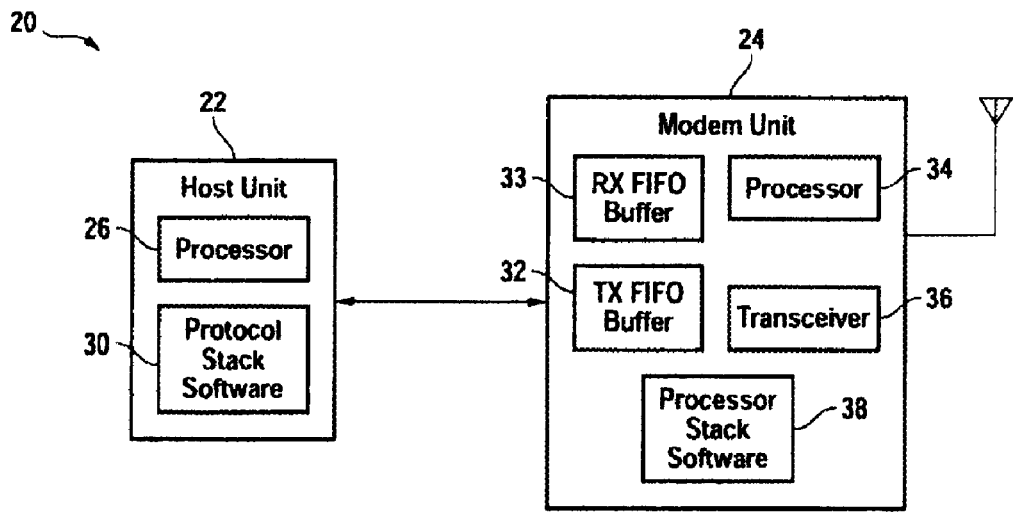
FIG. 1 is a diagram illustrating a host unit and a wireless communication unit for use with the system of the present invention.

FIG. 1 is a diagram that illustrates the interconnection between a host unit 22 and a wireless communication unit 24 of one embodiment of the present invention. The host unit 22 can be a portable or a laptop computer, a personal digital assistant (PDA), or any other type of data device. The wireless communication in one embodiment is a modem. The wireless communication unit 24 is preferably a removable card modem unit, such as a PCMCIA card.

The host unit 22 preferably includes a processor 26, and a protocol stack software 30 which allows the processor 26 to implement the protocol stack of the system of the present invention. The wireless communication unit 24 includes a transmitter (TX) FIFO buffer 32 for storing data from the host unit 22, a receiver (RX) FIFO buffer 33 for storing data to send to the host unit 22, a processor 34, a transceiver 36 and protocol stack software 38 that allows it to implement the protocol stack of the system of the present invention. The system 20 including the host unit 22 and the wireless communication unit 24 can be used for transmitting data over a wireless network, and thus can allow the host unit 22 to send E-mail messages or connect to the Internet.

Figure 2:
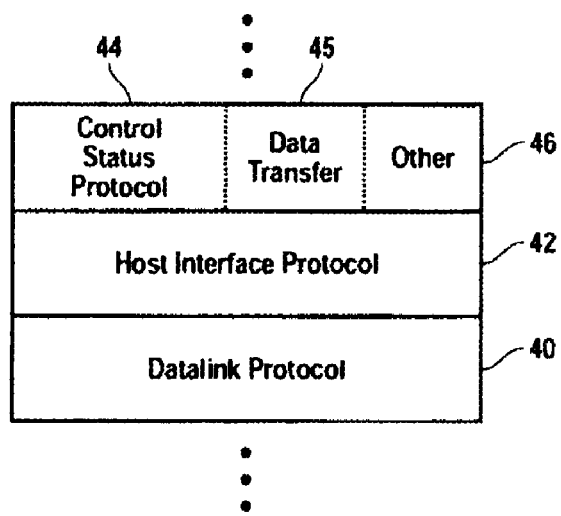
FIG. 2 is a diagram that illustrates portions of the protocol stack for data transfers between the host unit and the wireless communication unit.

FIG. 2 is a diagram that illustrates a portion of the protocol stack for message transmission between the host unit 22 and the wireless communication unit 24 shown in FIG. 1. A data-link protocol 40 concerns the data-link between the host unit and the wireless communication unit. The data-link protocol provides framing of datagrams. On top of the data-link protocol is the host interface protocol 42 which is described below. Running on top of the host interface protocol is the control and status protocol 44, also described below. Also running on the host interface protocol are any data transfer protocols 45 which allow for the transfer of data to be transmitted over the wireless communication unit or from the wireless communication unit to the host unit. Other protocols 46 can also be run on top of the host interface protocol 42. As will be discussed below, the ability of the host interface protocol to multiplex between data transfers and control and status information is quite useful.

Figure 3:
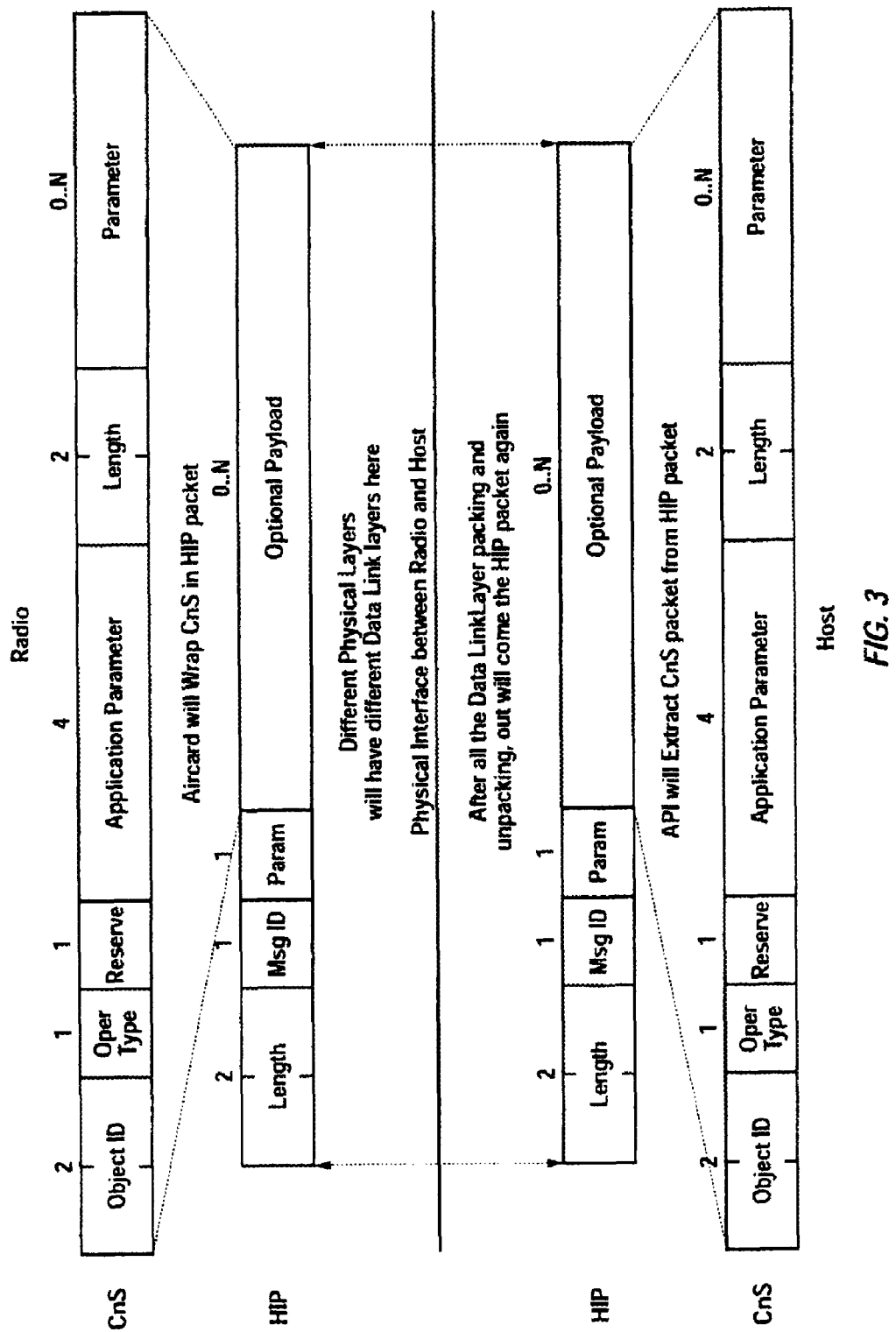
FIG. 3 is a diagram illustrating the interrelation of the control and status messages and post-interface protocol messages.

FIG. 3 is a diagram that illustrates the transfer of control and status messages within the host interface protocol message. At the wireless communication unit, a control and status message is constructed which is wrapped within a host interface protocol message. Depending upon the system layout, different data-link layers are used for the message transfer. At the host unit, the host interface protocol message is examined and, in a preferred embodiment, an application programming interface (API) running the protocol stack will extract the control and status packet from the host interface protocol packet.

Figure 4:
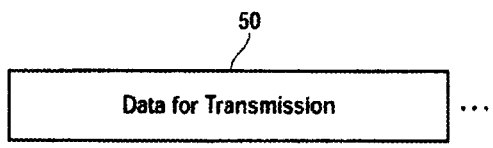
FIG. 4 is a diagram of prior-art data transmitted between host unit and wireless communication unit.
Figure 5A:
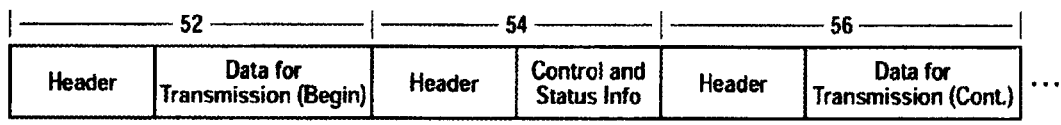
FIGS. 5A and 5B are diagrams illustrating a host interface protocol that allows for multiplexing data for transmission as well as the control and status messages.
Figure 5B:
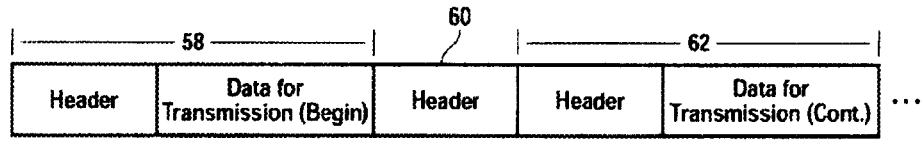

FIGS. 4 and 5A-5B illustrate the advantage of having a host interface protocol to multiplex between data transfers and control and status transfers. FIG. 4 shows data 50 for transmission. Such data can be relatively long and prevent any control and status signals to be sent while the data is being transferred. FIG. 5A shows the use of the host interface protocol such that the data for transmission is broken up. Some of the host interface protocol messages include the data for transmission but others can include the control and status information in a control and status protocol message. This allows for control and status information to be multiplexed within larger data transmissions between the host unit and the wireless communication unit. The example shown in FIG. 5A illustrates a host interface protocol message 54 including the control and status protocol message interspersed between host interface protocol messages 52 and 56 which contain data for transmission.

The host interface protocol does not need to have a payload but can contain some signaling information within the header itself. This is shown in FIG. 5B, in which the payloadless header 60 is positioned between the host interface protocol message 58 and host interface protocol message 62 which contain data for transmission.

Figure 6A:
FIG. 6A is a diagram that illustrates host interface protocol messages.
Figure 6B:
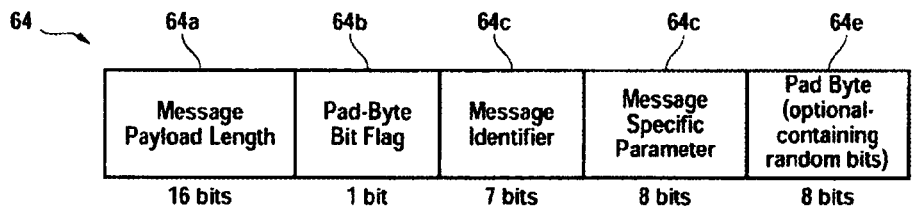
FIG. 6B is a diagram that illustrates a header for host interface protocol messages.

FIG. 6A illustrates a host interface protocol message with the message header 64 and optional message payload 66. FIG. 6B illustrates the message header with the message payload length 64a, pad-byte bit flag 64b message identifier 64c, message specific parameter 64d and optional pad-byte containing random data 64e. Note that the message identified 64c is quite useful because it allows for the multiplexing between data transfers and control and status transfers, as described above.

A variety of different messages can be exchanged between the host unit and the wireless communication unit. As will be described, the host interface protocol allows for the multiplexing between over-the-air data, wireless communication debugging and flash software downloads, and other types of messages. The message payload length field 64a helps identify the memory block buffer requirements to store the message. This length field is also useful to support alternative data length message transfer systems such as direct memory access. The length also helps indicate whether there is an odd or even number of bytes communicated in the message payload. In one embodiment, the maximum payload length for the host interface protocol is 2000 bytes. The pad-byte flag indicates whether any padding bytes are put in front of the message payload. If the pad-byte flag is set, then the message has padding bytes and the message payload length includes the length of the padding bytes and the message payload. The message identifier field indicates the message type.

The message specific parameter field indicates a word or line message header. The message type defines the use of this field.

In a preferred embodiment, different message IDs are used in different directions to prevent the echoing of messages across the interface and to aid in software debugging. The message ID header is preferably kept as simple as possible to reduce the complexity of the system. Additionally, the host interface protocol preferably implements a grant request/response mechanism to seek permission prior to sending data, such that flow control can be accommodated over the interface. The host interface protocol also allows for the production of a signal to the host to indicate when the wireless communication unit resets. This simplifies the start-up procedures on both sides of the interface. Additionally, the host interface protocol preferably implements a method of discarding stale messages that might be present in the FIFO buffers after a reset or a crash. The system also provides a mechanism to report error messages from the wireless communication device to the host. The host interface protocol also allows for interactive communication between the wireless communication unit and the host unit. Additionally, when the data-link layer uses an interface of high reliability (such as a PCMCIA interface), the host interface protocol can be simplified such that it reduces the processing burden on the microprocessor. The host interface protocol also preferably allows for feedback during the flash software upgrade.

In one embodiment there are three fundamental types of messages transferred between the host unit and the wireless communication unit indicated by the message ID field. These three fundamental types of messages are requests, responses, and indications.

A request message provides a means for the host to ask the wireless communication unit either to perform an operation or return a value. The wireless communication unit always responds to a request message with a response message. Because of the master/slave relationship between the host unit and the wireless communication unit, the wireless communication unit is not allowed to make requests of the host unit in a preferred embodiment. One and only one response message is sent in answer to each request message. Note that in order to provide full control to the wireless communication unit, a response to a specific request must be provided before a second request of the same type is issued. This effectively provides a stop-and-wait flow control on a per-request basis. If the host never receives a response within a time-out period, this is a failure case and thus the host unit can assume that the wireless communication unit has failed and should be recovered from a restart state.

Response messages are always sent from the wireless communication unit as a reply to the request from the host unit. The format and type of data of the response varies according to the type of response. Responses are not sent unsolicited. Thus, each response is paired with a specific request. In one embodiment, the request message IDs are in the range 00 to 31, and the response message IDs are in the range 64 to 95.

Indication messages provide a means to send unsolicited data from either side of the interface. Indications are used when no reply or return data is required from the receiver. No acknowledgment or reply is sent by the receiver of an indication in a preferred embodiment. The indications can include the over-the-air messages received from the wireless communication unit and sent to the host unit, as well as messages to be sent over the air from the host unit to the wireless communication unit and data passing back and forth between the flash memory. In one embodiment the indication messages ID from the host are in the range 32 to 63; indication message ID sent from the card are in the range 96 to 127.

In one embodiment, the host interface protocol rules are such that if a message is received from either side of the interface containing undefined message ID, it will be discarded. If the maximum size of the message is exceeded, the receiver will discard the entire packet and ignore the message. In a preferred embodiment, the pad-byte flag set will only be used for messages sent from the wireless communication unit to the host unit. The card will discard received reverse-channel data indication messages containing unexpected message sequencing numbers. The card application will ignore all boot loader specific messages. The boot loader will only receive the packets and the protocol if the host has placed the wireless communication unit into a firmware download mode. The boot indication packet can be sent from the host device during startup to provide the host driver with startup information, but it will not wait for or process host messages.

Appendix I included with this specification includes a list of message identifiers of one embodiment of the present invention. Appendix I is hereby incorporated by reference in full.

One embodiment of the messaging supported by the host interface protocol is given below. The boot loader messages allow the loading of firmware onto a flash memory card in the wireless communication unit. The boot loader messages include download start requests, download response, download continuation requests, download continuation responses, download end requests, download end responses, flash program requests, flash program responses, launch fragment indication, and start application indication.

The wireless communication device startup messages include host data-link synchronization indication, data-link synchronization indication, boot information indication, restart indication.

The over-the-air messages include reverse channel grant messages, reverse channel data indications, forward channel data indications.

The control and status messages which can be indicated by a header without payload include system shutdown indications, configuration information requests, configuration information responses, packet session activation requests, packet session activation responses, link status indications, abort indications, wireless communication device control and status indications, host control and status indications, loopback requests, loopback responses, packet data protocol (PDP) context summary requests, PDP context summary responses, host environment indications.

Debugging messages which can be sent include wireless communication device command indications, host command indications, wireless communication device protocol stack indications, host protocol stack indications, wireless communication device AT command indications, host AT command indications, wireless communication device debug log indications, host debug log indications.

Details of the host interface protocol of one embodiment are described within Appendix I.

Figure 7:
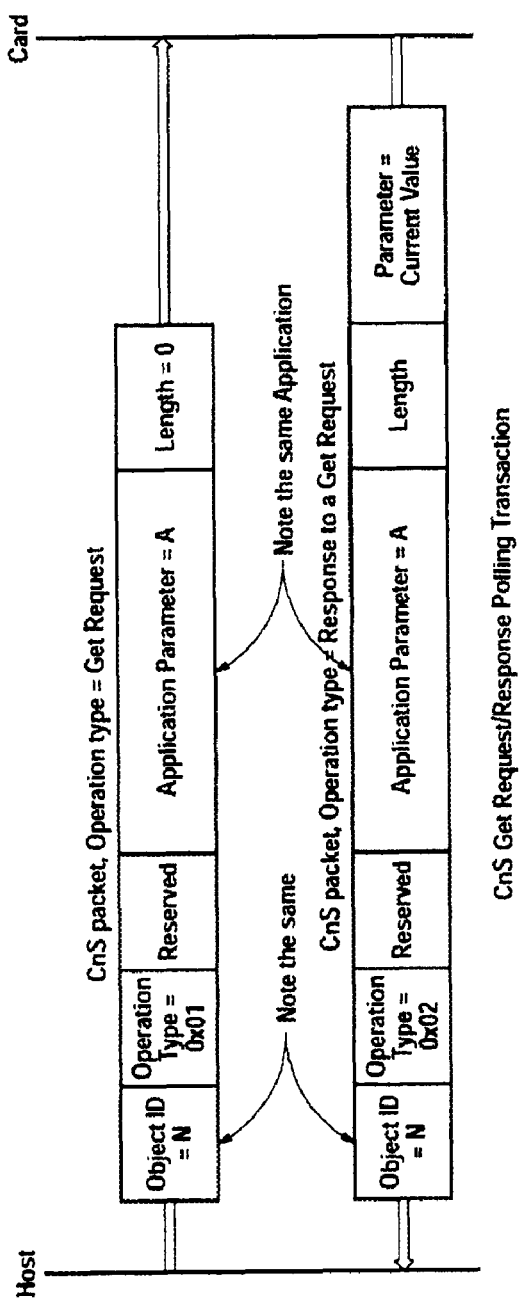
FIG. 7 is a diagram that illustrates the transfer of control and status messages between the host unit and the wireless communication unit.

FIG. 7 illustrates the control and status packet for a get request and a response to a get request. Note that the application parameter is set the same, and the object ID is set the same.

FIG. 8A illustrates the control and status packets which are wrapped within the host interface protocol messages in a preferred embodiment of the present invention.

The control and status packet is preferably encapsulated within the host interface protocol. Starting with a control and status message, both the wireless communication unit and the host unit must encapsulate and de-encapsulate the control and status message and then perform any data-link layer framing that is necessary. Two types of data-link layer framing are anticipated, one for Universal Asynchronous Receive-Transmit (UART) communications and another for Network Drive Interface Specification (NDIS) communications. The control and status data communicated in the variable length binary packets all multibyte fields preferably use a network byte order. The control and status packets go into the payload section of the host interface protocol packets, and such are a subtype of the information available on that interface.

Figure 8:
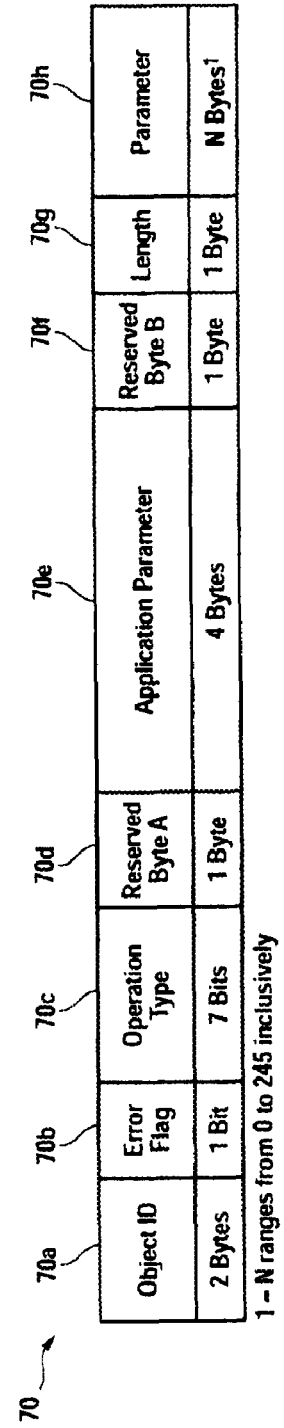
FIG. 8 is a diagram that illustrates the control and status message protocol for one embodiment of the present invention.

The fields of the control and status packet available are shown in FIG. 8 for one embodiment of the present invention. The control and status packet 70 includes an object ID field 70a, an error flag field 70b, an operation type field 70c, a reserved byte A field 70d, an application parameter field 70e, a reserved byte B field 70f, a length field 70g and a parameter field 70h. The object ID 70a indicates the type of the control and status message. The operation type field 70c indicates the type of operation, request, response notification, and so on. The reserved fields 70d and 70f are reserved for a specific type of use and are set to zero if not used. The application parameter field 70e indicates the ID of the sender task and is set to 0 if not used. The length field 70g preferably indicates the length of the parameter field 70h. In one embodiment, the maximum size of the control and status packet is fixed to 256 bytes including the header, so that the maximum parameter length is 246 bytes.

The types of control and status transactions available include polled command and response to allow the application to poll a wireless communication unit. The command sent to the wireless communication unit and the response returned to acknowledge the command. Depending upon the context of the command, the response may contain data such as status information or may simply be an acknowledgment. There are two types of operation for the poll commands; get requests, and response to get requests. Other types of transactions is write/action command and response. This type of transaction allows the application to write certain parameters or trigger an action within the wireless communication unit. If the transaction is used as a write command, the response will contain the newly-changed data. No parameters are included when the transaction is used in an action trigger. There are two types of operation types for this transaction. Set request, and response to set request.

Another type of control and status transactions are notifications. Notification information is unsolicited asynchronous status updates sent by the wireless communication unit. Upon power-up, notifications are always disabled. Notifications must be explicitly enabled the control and status mechanism. Different types of information can be sent. The criteria for unsolicited update depend upon the actual information being forwarded. Notifications include notification requests, response to notification requests, notification packets, notification stop requests and response to notification stop requests.

The host interface protocol and control and status frames can be sent over any link layer protocol. Examples of link layers include NDIS protocol framing and UART link layer protocol. Th e link layer over the FIFO considers the host interface protocol packet structure plus an optional payload at the end. This optional payload consists of either a point to point protocol (PPP) packet, and control and status packet, an AT command packet, a protocol stack message or debug message. Each of these packet types is identified by its unique message 1D. The UART link layer protocol is a link layer over the UART consisting of marking the host interface protocol package with start and end flags and escaping the data within.

Appendix I illustrates the different control and status messages of one embodiment of the present invention in detail.

Figure 9:
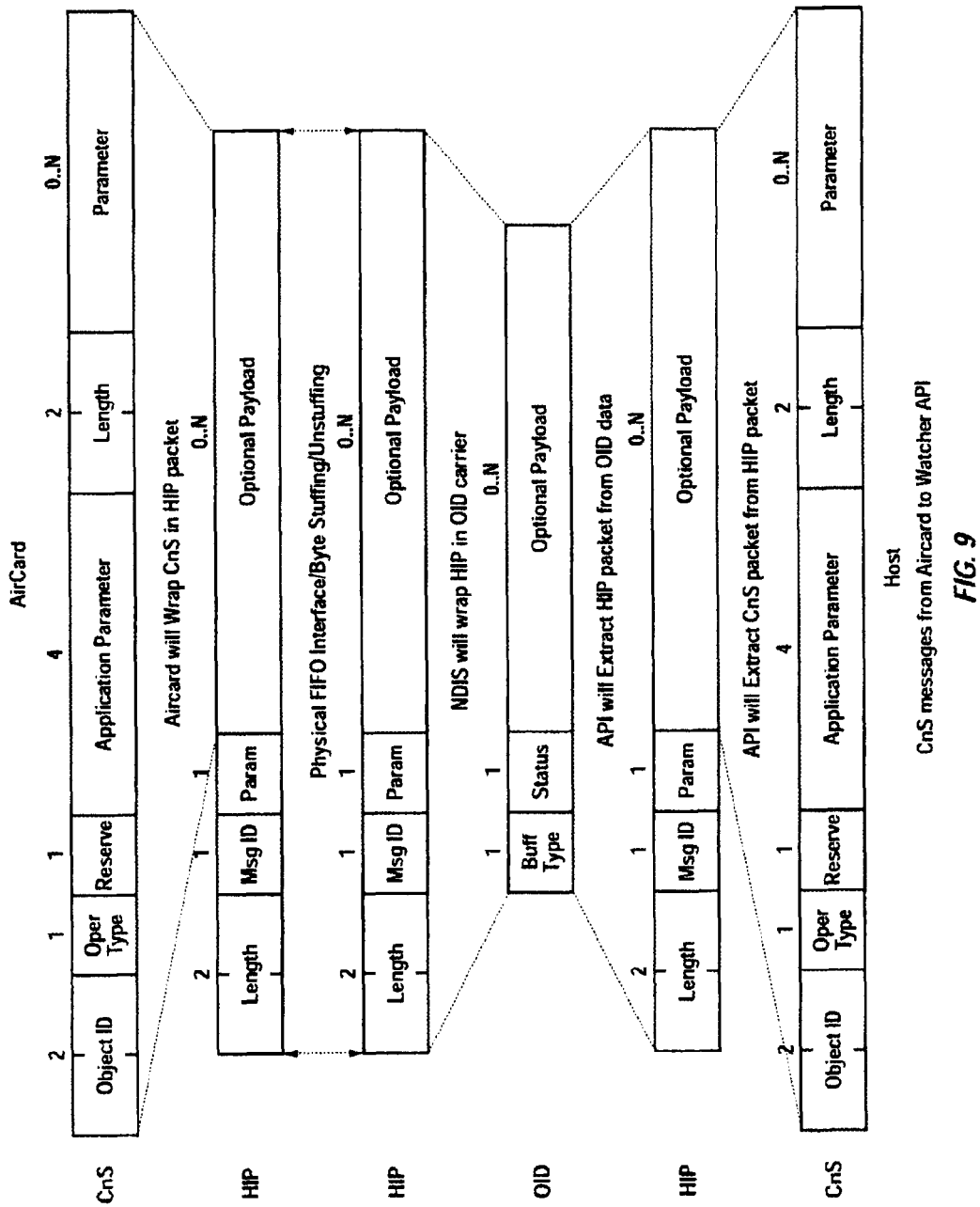
FIG. 9 is a diagram that illustrates control and status message transfers between the wireless communication unit and the host for one embodiment of the present invention.

FIG. 9 illustrates the transfers between the wireless communication unit and the host unit for one embodiment of the present invention.

Figure 10:
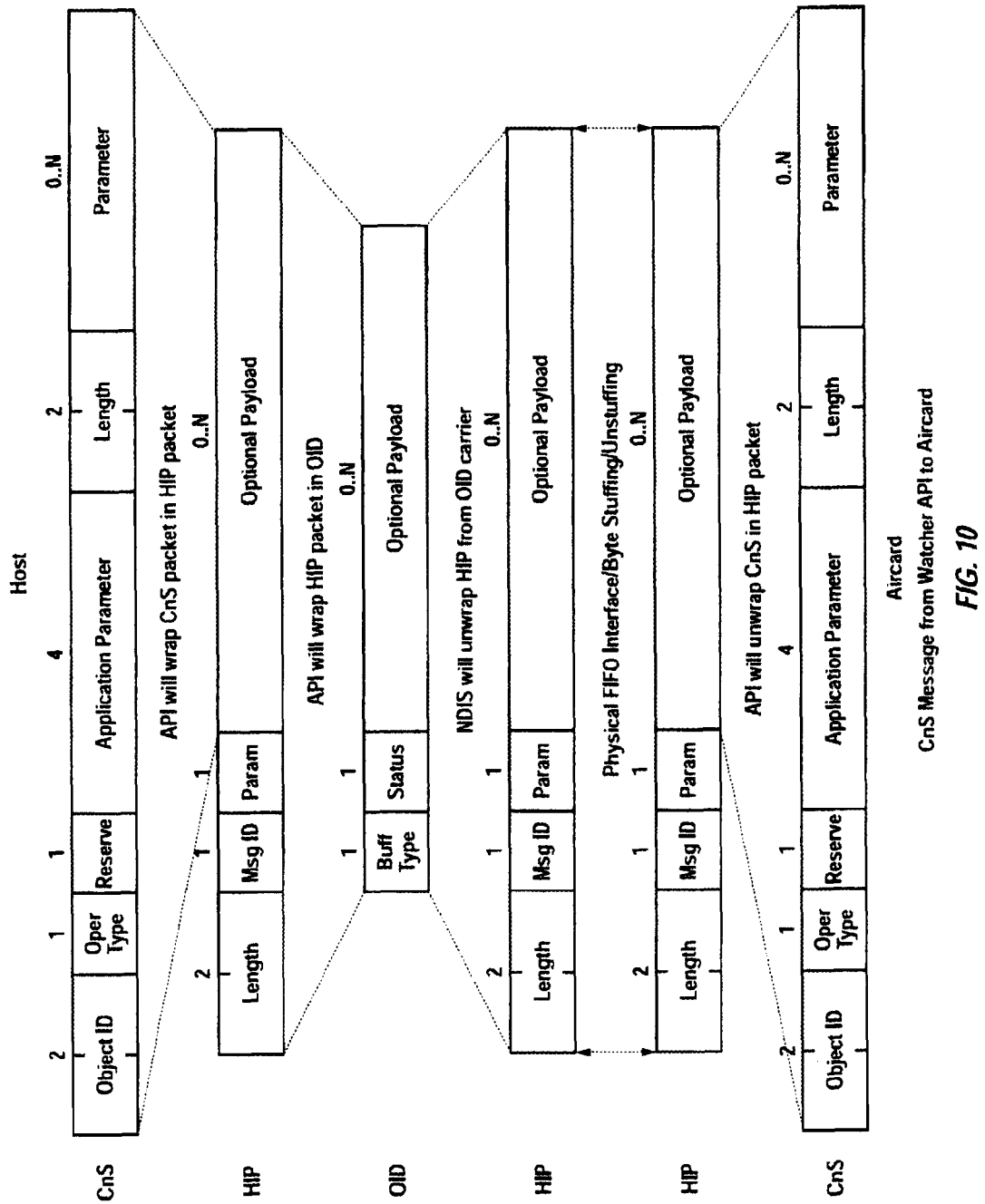
FIG. 10 is a diagram that illustrates the transfer of control and status messages between the host and the wireless communication unit for one embodiment of the present invention.

FIG. 10 illustrates the transfers between the host unit and the wireless communication unit for one embodiment of the present invention.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

The invention claimed is:

1. An apparatus comprising:
   a host unit comprising a data device including a processor; and
   a wireless communication unit removably coupled to the host unit and including a transceiver, wherein the host unit and the wireless communication unit are configured to use a host interface protocol in communicating between the host unit and the wireless communication unit over a first interface, the host interface protocol defining a message header with a length field and message id field, the message id field allowing multiplexing between data stream transfers and status transfers for information sent between the host unit and wireless communication unit and wherein the host unit and the wireless communication unit are further configured to use a control and status protocol for control and status message transfers over the first interface between the host and the wireless communication unit, control and status messages being wrapped within host interface protocol messages, the wireless communication unit further configured to transmit data over a wireless network using a second interface.

2. The apparatus of claim 1 wherein transmissions between the host unit and the wireless communication unit include a data-link protocol.

3. The apparatus of claim 1 wherein the message ID field of the host interface protocol distinguishes between requests, responses, and indications.

4. The apparatus of claim 1 wherein the wireless communication unit is configured as a slave to the host unit.

5. The apparatus of claim 1 wherein the host unit is configured to produce request messages to send toward the wireless communication unit, and the wireless communication unit is configured to produce response messages in response to the requests.

6. The apparatus of claim 1 wherein a control message with a corresponding host interface protocol header message ID can be received within a buffer interspersed with messages for the data transmission to allow for multiplexing.

7. The apparatus of claim 1 wherein the wireless communication unit is configured as a modem unit.

8. An apparatus comprising:
   a host unit comprising a data device; and
   a wireless communication unit removably coupled to the host unit, the host unit and the wireless communication unit configured to use a host interface protocol for communications between the host unit and the wireless communication unit over a first interface, the host interface protocol defining a message header with a length field and message id field, the message id field allowing multiplexing between data stream transfers and control and status transfers for information sent into buffers of the host and wireless communication unit, the host unit and the wireless communication unit further configured to use a control and status protocol for control and status message transfers over the first interface between the host unit and the wireless communication unit, control and status messages being wrapped within host interface protocol messages, the wireless communication unit further configured to transmit data over a wireless network using a second interface.

9. The apparatus of claim 8 wherein the host unit and the wireless communication unit are further configured to use data link protocols.

10. The apparatus of claim 8 wherein the host interface protocol allows additional protocols besides the control and status protocol to be wrapped within the host interface protocol messages.

11. The apparatus of claim 8 wherein the host interface protocol message id fields can be used to indicate whether the messages are requests, responses or indications.

12. The apparatus of claim 8 wherein the data stream transfers are a type of indication.

13. The apparatus of claim 8 wherein the control message with the corresponding host interface protocol message ID can be received interspersed with messages for data transmission to allow for multiplexing.

14. The apparatus of claim 8 wherein the wireless communication unit is configured as a modem unit.

15. A computer implemented method comprising:
    at a wireless communication unit removably coupled to a host unit, receiving a control message from the host unit over a first interface, the host unit comprising a data device coupled to the wireless communication unit, the control message conforming to a host interface protocol by having a message header with a length field and a message identification field; and
    multiplexing the control message among one or more data transfers, the data transfers conforming to the host interface protocol by having a message header with a length field and a message identification field, the multiplexing accomplished using the message identification fields of the control message and the data transfers, the wireless communication unit further configured to transmit data over a wireless network using a second interface.

16. The method of claim 15, further comprising:
    sending a response control message toward the host unit, the response control message corresponding to the control message but having a different value in the message identification field.

17. The method of claim 15, wherein the control message is a request message and the message identification field identifies it as a request message.

18. The method of claim 17, wherein a request message asks the wireless communication unit to perform an operation and/or return a value.

19. The method of claim 18, wherein a response control message corresponding to the request message must be received by the host unit before the host unit generates another request message of the same type.

20. The method of claim 15, wherein the control message is an indication message and the message identification field identifies it as an indication message.

21. The method of claim 20, wherein a control message sends unsolicited data without the need for a response.

22. An apparatus comprising:
means for, at a wireless communication unit removably coupled to a host unit, receiving a control message from the host unit over a first interface, the host unit comprising a data device coupled to the wireless communication unit, the control message conforming to a host interface protocol by having a message header with a length field and a message identification field; and
means for multiplexing the control message among one or more data transfers, the data transfers conforming to the host interface protocol by having a message header with a length field and a message identification field, the multiplexing accomplished using the message identification fields of the control message and the data transfers, the wireless communication unit further configured to transmit data over a wireless network using a second interface.

23. The apparatus of claim 22, further comprising:
means for sending a response control message toward the host unit, the response control message corresponding to the control message but having a different value in the message identification field.

24. The apparatus of claim 22, wherein the control message is a request message and the message identification field identifies it as a request message.

25. The apparatus of claim 24, wherein a request message asks the wireless communication unit to perform an operation and/or return a value.

26. The apparatus of claim 25, wherein a response control message corresponding to the request message must be received by the host unit before the host unit generates another request message of the same type.

27. The apparatus of claim 22, wherein the control message is an indication message and the message identification field identifies it as an indication message.

28. The apparatus of claim 27, wherein a control message sends unsolicited data without the need for a response.

* * * * *